United States Patent

[11] 3,566,103

| [72] | Inventors | Clinton S. Wilcox;<br>Vincent P. Kovalcik, Rochester, N.Y. |
|---|---|---|
| [21] | Appl. No. | 781,742 |
| [22] | Filed | Dec. 6, 1968 |
| [45] | Patented | Feb. 23, 1971 |
| [73] | Assignee | General Signal Corporation<br>Rochester, N.Y. |

[54] RAIL VEHICLE CONTROL SYSTEMS
4 Claims, 1 Drawing Fig.

[52] U.S. Cl..................................... 246/182,
246/187(B)
[51] Int. Cl..................................... B61l 3/10
[50] Field of Search............................. 246/182
(C), 187 (B), 122

[56] References Cited
UNITED STATES PATENTS

| 3,270,199 | 8/1966 | Smith | 246/182(C) |
| 3,297,867 | 1/1967 | Archibald | 246/122 |
| 3,334,224 | 8/1967 | Allen et al. | 246/122X |
| 3,457,403 | 7/1969 | Smith, Jr. | 246/182(C) |

*Primary Examiner*—Arthur L. LaPoint
*Assistant Examiner*—George H. Libman
*Attorneys*—Jeremiah J. Duggan and Harold S. Wynn ABSTRACT: A system for controlling the operation of rail vehicles in response to a continuously variable frequency in the rails, wherein the frequency varies in accordance with the distance of the vehicle relative to a wayside location at which the frequency is applied to the rails. This distance frequency signal is used in combination with a frequency signal generated in accordance with the actual speed of the vehicle to control operation of the vehicle.

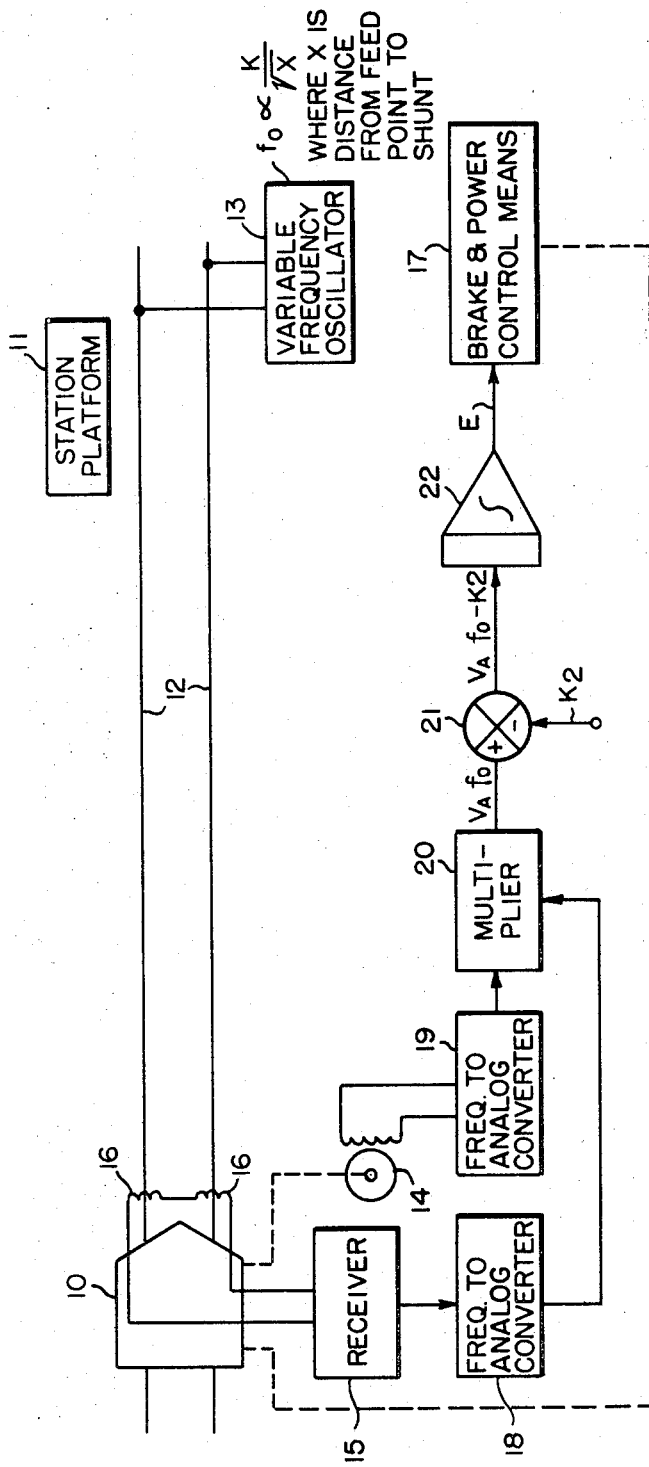

RAIL VEHICLE CONTROL SYSTEMS

This invention relates to rail vehicle control systems, and it more particularly pertains to the automatic control of the speed of a vehicle in accordance with the distance of the vehicle from a particular wayside location.

Present systems for the control of a vehicle in approaching a stopping point, for example, require wayside markers, coils, or wiggle wires to communicate to vehicles the location of such vehicles relative to a desired stopping point at a wayside location. In accordance with such communication, a stopping pattern is computed on the vehicle, and the vehicle is controlled to operate according to this pattern.

An object of the present invention is to provide an improved vehicle control system wherein distance of a vehicle to a wayside location is continuously communicated to the vehicle by transmission through the rails of a variable frequency signal wherein the frequency is characteristic of the distance to go to the wayside location.

SUMMARY OF INVENTION

An improved rail vehicle speed control system is provided according to the present invention having means including a variable frequency oscillator for transmitting through the rails from a wayside location, or feed point, to a vehicle a signal variable in frequency in accordance with the distance from the vehicle to the wayside 100 location. Means is provided on the vehicle for receiving the variable frequency distance signal from the rails. The vehicle has a vehicle driven frequency generator for generating a frequency comparable to the actual speed of the vehicle, the control means is provided that is governed jointly by the distance frequency signal and the speed frequency signal for controlling the speed of the vehicle substantially continuously as it proceeds relative to location. wayside location For a better understanding of the present invention, together with other further objects thereof, reference is had to the following description, taken in connection with the accompanying drawing, while its scope will be pointed out in the appending claims.

With reference to the drawing, a rail vehicle 10 is illustrated as approaching a station platform 11 on track rails 12. A variable frequency oscillator 13 is connected to the track rails 12 at a wayside location close to the end of the station platform at which the front end of the vehicle 10 may be required to be stopped. The frequency of the oscillator 13 is varied in response to the approach of the train 10 to the station platform, so that the frequency generated by the oscillator is characteristic of the distance of the vehicle 10 in approach of the wayside location at which the feed for the oscillator 13 is connected to the track rails. A variable frequency oscillator of the type contemplated in the invention responsive to the proximity of a vehicle may be seen in an I. M. Gottlieb, U.S. Pat. No. 3,474,409.

The vehicle 10 has an axle driven generator 14 for generating a signal that is variable in frequency according to the speed of the vehicle 10.

A receiver 15 on the vehicle 10 receives the variable frequency in the track rails 12 which is induced in track coils 16 carried by the vehicle 10 and inductively coupled to the track rails. The variable frequency signal received from the track rails in the receiver 15, and the variable frequency signal generated by the axle driven generator 14 are combined to provide an error signal E to govern brake and power control means 17 to operate the vehicle 10 according to a desired braking pattern upon approaching a stopping point at the station platform 11.

The error signal E for governing operation of the brake and power control means 17 is computed by first converting the distance frequency and actual speed frequency signals to analogue values in converters 18 and 19 respectively and then multiplying the analogue values in a multiplier 20. An output of multiplier 20 which is a signal corresponding to the product of the outputs of the converters 18 and 19 is applied as an input to a deviation detector 21 in which it is compared with a constant signal $K_2$. If the vehicle 10 is operating according to a desired approach speed pattern in approaching the station platform 11, the inputs to the deviation detector 21 are substantially in balance, and thus there is no output of the deviation detector. If the speed of the vehicle is either above or below the desired speed approach pattern, there will be a plus or minus output of the deviation detector 21 which is applied through an integrator 22 to develop a suitable error signal E for the control of the brake and power control means 17 to correct in the proper direction for the error that is indicated as a deviation above or below the desired speed pattern in approaching the station platform 11.

The frequency $f_o$ of the variable frequency oscillator 13 varies inversely in accordance with the distance from the feed point, at the wayside location of connection of the oscillator to the track rails, to a shunt of the rails applied by an approaching vehicle 10. This variation in the frequency $f_o$ is obtained by sensing the reduction in the rail inductance between the wayside location and the vehicle 10 as the vehicle approaches the station platform. The track rails 12 can be considered, for example, as an alternating current transmission line that is terminated by the vehicle 10. Thus the rail inductance in the circuit varies in accordance with the distance from the feed point to the vehicle 10, and this variation in inductance can be used to vary the frequency $f_o$ applied by the oscillator 13 to the track rails. Also, the variable frequency operation of the oscillator could be governed in accordance with the amplitude of the signal across the track rails at the feed point, if the track rails were energized at the feed point from a constant current source. Under these conditions, the voltage across the track rails 12 at the feed point would be considered as an analogue of distance from the feed point to the vehicle 10, and this analogue could be converted to a variable frequency for transmission through the track rails 12 to the vehicle 10 so that the frequency transmitted would vary inversely in proportion to the distance from the vehicle 10 to its stopping point at the end of the station platform.

Thus the oscillator frequency $f_o$ can be expressed by:

$$f_o \alpha \frac{1}{\sqrt{x}} \text{ or } f_o = \frac{K}{\sqrt{x}}$$

where $x$ is the distance from shunt to feed point.

For computing a desired stopping pattern:

$$V_D = A\sqrt{x}$$

where $V_D$ is the desired velocity
$A$ is $2a$ for constant deceleration.

$$\sqrt{x} = \frac{K}{f_o} \text{ or } V_D = \frac{A \cdot K}{f_o} = \frac{K_2}{f_o}$$

Since it is desired that the actual velocity should equal the desired velocity, then $$V_A = \frac{K_2}{f_o} \text{ or } f_o \cdot V_A = K_2$$

where $V_A$ is the actual velocity.

Therefore the above derived expression is implemented by the multiplier 20 and the deviation detector 21.

A modified form of the invention could provide the receiving coil 16 on the rear of the vehicle 10 rather than on the front of the vehicle, and could provide for the connection of the variable frequency oscillator 13 to the rails 12 at a feed point location in approach of the station platform comparable to a starting point for a station stop program. According to this arrangement, the distance frequency signal received at the rear of the vehicle 10 would vary directly with the distance from the vehicle to its stopping point at the station platform so that the distance frequency signal would decrease as the frequency of the frequency generator 14 decreases upon the reduction of the speed of the vehicle 10. By modifying the apparatus in the way suggested, the frequency signals of the variable frequency oscillator 13 and the frequency generator 14 may be directly compared. In the previous embodiment when the variable frequency oscillator 13 feeds the track 12 in the vicinity of the station platform, the frequency signals are inversely related as previously recited while in the modified form they are directly related facilitating utilization of the signals in computing the stopping point. By choosing proper frequencies for the generator 14 and for the variable frequency oscillator 13, the distance variable frequency could be compared directly with the speed variable frequency to obtain an input signal to the integrator 22.

While there has been described what is at present considered to be the preferred embodiment of the invention, it will be obvious to those skilled in the art that various changes and modifications may be made therein, without departing from the invention, and it is, therefore, aimed in the appending claims to cover all such changes and modifications as fall within the true spirit and scope of the invention.

We claim:

1. A rail vehicle speed control system wherein the improvement comprises:
   a. means including a variable frequency oscillator for transmitting through the rails from a wayside location to a vehicle a signal variable in frequency automatically in response to changes in distance from the vehicle to the wayside location;
   b. means on the vehicle for receiving the variable frequency distant signal from the rails;
   c. means on the vehicle for generating a signal variable in frequency according to the speed of the vehicle; and
   d. control means governed jointly by the distance frequency signal and the speed frequency signal for controlling the speed of the vehicle substantially continuously as it proceeds relative to the wayside location.

2. The invention according to claim 1 wherein the control means comprises computing means for generating a stopping pattern to stop the vehicle substantially at the wayside location.

3. The invention according to claim 2 wherein the computing means comprises means for comparing a product of signals characteristic of the respective frequencies of the distant and speed frequency signals with a constant to obtain an error signal.

4. The invention according to claim 3 wherein the error signal is used in the control means to control the speed of operation of the vehicle.